A. C. LINDGREN.
MECHANISM FOR CONTROLLING THE CONNECTION BETWEEN DRIVING AND DRIVEN GEARS.
APPLICATION FILED MAY 28, 1910.
989,373.
Patented Apr. 11, 1911.
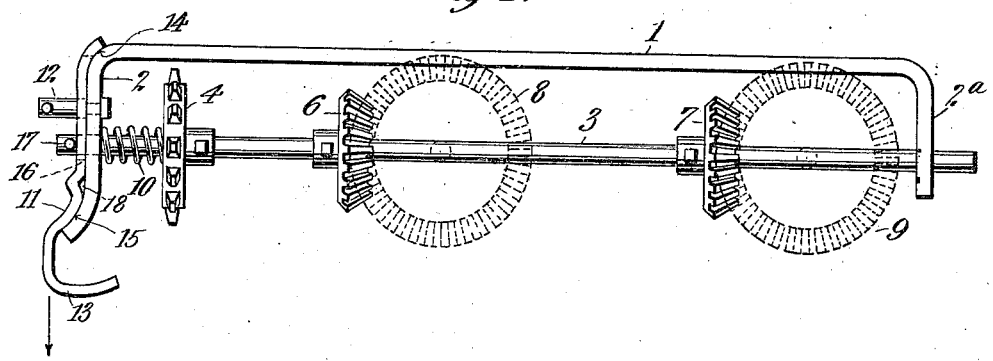
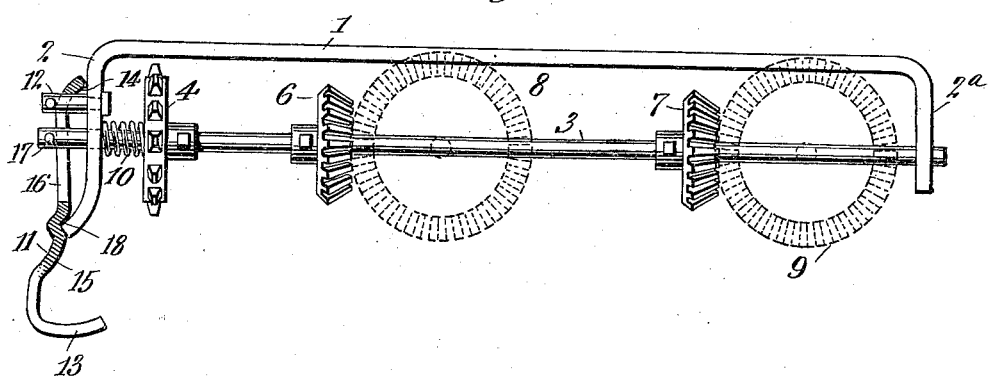
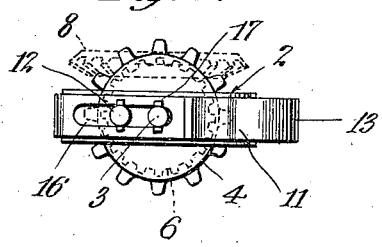
Witnesses:
Frank S. Ober
L. C. Morrison
Inventor:
ALEXUS C. LINDGREN
By his Attorney P. F. Dodge

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

MECHANISM FOR CONTROLLING THE CONNECTION BETWEEN DRIVING AND DRIVEN GEARS.

989,373. Specification of Letters Patent. Patented Apr. 11, 1911.

Application filed May 28, 1910. Serial No. 563,881.

*To all whom it may concern:*

Be it known that I, ALEXUS C. LINDGREN, of Moline, county of Rock Island, and State of Illinois, have invented a new and useful Improvement in Mechanism for Controlling the Connection Between Driving and Driven Gears, of which the following is a specification.

This invention relates to mechanism for controlling the connection between driving and driven gears, such mechanism being applicable for instance in connection with agricultural implements, such as seeding machines or fertilizer distributers, to control the action of the discharge mechanism.

The invention consists of mechanism of improved form which may be readily operated by the attendant to connect up the driving mechanism with the driven mechanism, or to disconnect these parts so that when desired the driven mechanism may be brought to rest.

In its preferred embodiment my improved mechanism consists of the combination with a driven mechanism and an endwise movable driving shaft adapted to be operatively engaged with the driven mechanism, of a controlling device slidingly engaged with the shaft and movable transversely thereof and also movable longitudinally of the shaft, and means whereby the transverse movement of the controlling device will shift it and the shaft endwise to disconnect the shaft from the driven mechanism.

In the accompanying drawings: Figure 1 is a top plan view of my improved mechanism showing the same as applied in connection with two driven mechanisms, the controlling device being in position to cause the driving and driven mechanisms to be engaged. Fig. 2 is a similar view showing the controlling mechanism in the position it occupies when the driving and driven devices are disengaged. Fig. 3 is an end elevation of the same.

Referring to the drawings: 1 represents a fixed transverse frame bar having rearwardly turned integral arms 2, 2ᵃ, which afford bearing supports for a transverse operating shaft 3, which latter is longitudinally shiftable as well as rotatable in said bearings. The shaft has fixed to it a sprocket wheel 4 which may be driven from any suitable source of power. The shaft has further fixed to it bevel gears 6 and 7, which are adapted when the shaft is in one position, to engage respectively driven gears 8 and 9 constituting the driven mechanism, and which are adapted when the shaft is in another position, to be disengaged from the gears 8 and 9. Surrounding the shaft between the arm 2 and the sprocket wheel, is a coiled-spring 10 which acts to urge the shaft to the right (Fig. 1) and to maintain operative engagement of the driving and driven gears.

The controlling device for governing the connection of the driving and driven gears consists of a slotted, slidable strap 11 guided on a stud 12 projecting from the arm 2, and provided with an actuating handle 13 at one end thereof. The strap is further provided with offset surfaces 14 and 15 which conform to similar surfaces on the arm 2, the normal position of the strap being flat against the arm as shown in Fig. 1, with the corresponding offset surfaces in contact, with the shaft at its extreme position to the right. At its left hand end the shaft projects through an elongated slot 16 in the strap and is provided with a crosshead or pin 17. When the strap is drawn in the direction indicated by the arrow in Fig. 1, the offset portions will ride up on the corresponding offset portions on the arm 2, whereby the strap will be caused to separate from said arm as shown in Fig. 2, thereby positively drawing the operative shaft bodily in an endwise direction against the pressure of the spring, with the result that the driving gears on the shaft will be disengaged from the driven gears, and the mechanism actuated by the driven gears will come to rest. In this position the offset end of the arm 2 will engage in a notch 18 in the strap and will maintain the parts in position to hold the gears disengaged. In effecting the engagement of the gears, the strap is forcibly pushed in a direction opposite to the disengaging movement, whereby the spring will automatically restore the parts to normal operative position.

In the accompanying drawings, I have shown my invention in the form which I prefer to adopt and which in practice has been found to answer to a satisfactory degree the results to be secured. It will be understood, however, that the invention is susceptible of such changes in detail and modifications as will suggest themselves to the skilled mechanic; and further, it will be understood that the invention is not to be limited to any particular form or construction of the parts except in so far as such limitations are specified in the claims.

Having thus described my invention, what I claim is:—

1. In combination with the frame, a driven mechanism sustained thereby, an endwise movable driving shaft mounted on the frame, a driving gear on the shaft adapted to engage and drive the driven mechanism, a spring acting on the shaft and operating to hold the driving gear engaged, a controlling device slidingly engaged with the shaft and movable transversely thereof and also longitudinally of the same, and means whereby the transverse movement of the controlling device will shift it and the shaft endwise against the action of the spring.

2. In combination with the frame, a driven mechanism sustained thereon, an endwise movable driving shaft mounted on the frame, a driving gear on the shaft adapted to engage and drive the driven mechanism, a transversely movable controlling device mounted on the frame and slidingly engaged with said shaft and adapted by its transverse movement to be shifted longitudinally of the shaft and to shift the same endwise therewith.

3. In combination with the frame, a driven mechanism sustained thereon, an endwise movable driving shaft mounted on the frame, a driving gear on the shaft adapted to engage and drive the driven mechanism, a transversely movable controlling device mounted on the frame and slidingly engaged with said shaft and adapted by its transverse movement to be shifted longitudinally of the shaft and to shift the same endwise therewith, the said controlling device adapted to be automatically locked in position when so shifted to move the parts.

4. In combination with the frame, a driven mechanism thereon, a driving shaft mounted on the frame and movable endwise, a driving pinion carried by the shaft and adapted to operate the driven mechanism, a spring acting to hold the shaft yieldingly with its driving pinion engaged, a transversely movable controlling device engaging the shaft and provided with a deflecting surface to cause it and the shaft to be shifted longitudinally when said controlling device is moved transversely.

5. In combination with the frame having a longitudinally extending arm provided with an offset, a driven mechanism sustained by the frame, a driving shaft mounted on the frame and extending loosely at one end through said arm, a pinion carried by the shaft and adapted to engage and drive the driven mechanism, said shaft being movable with the pinion endwise to disengage the same, means for driving the shaft, a spring acting on the shaft to hold the same in position with its pinion engaged, a controlling device movable along the side of the arm and provided with an offset adapted to coöperate with that on the arm, said controlling device being formed with a slot through which the driving shaft extends and engaging the shaft, the said offsets on the arm and controlling device being so formed relatively that when the controlling device is moved along the arm, said device will be shifted in the direction of the shaft's axis and will move said shaft endwise.

6. In combination with the frame having a longitudinally extending arm provided with an offset, a driven mechanism sustained by the frame, a driving shaft mounted on the frame and extending loosely at one end through said arm, a pinion carried by the shaft and adapted to engage and drive the driven mechanism, said shaft being movable with the pinion endwise to disengage the same, means for driving the shaft, a controlling device movable along the side of the arm and engaging the shaft and provided with an offset to coöperate with that on the arm, the said offsets on the arm and controlling device being so formed relatively that when the controlling device is moved in one direction relatively to the shaft, said device will be shifted in the direction of the shaft's axis and will move said shaft endwise, and means acting when the controlling device moves in the opposite direction to restore said shaft to its former position.

In testimony whereof I hereunto set my hand this 23rd day of May, 1910, in the presence of two attesting witnesses.

ALEXUS C. LINDGREN.

Witnesses:
L. C. BLANDING,
C. A. BANISTER.

---

Copies of this patent may be obtained for five cents each, by addressing the "Commissioner of Patents, Washington, D. C."